Patented Mar. 3, 1925.

1,528,638

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ANTISLIP FLOOR.

No Drawing. Application filed June 28, 1922. Serial No. 571,569.

*To all whom it may concern:*

Be it known that I, FRANK J. TONE, a citizen of the United States, residing at Niagara Falls, in the county of Niagara and State of New York, have invented a new and useful Improvement in Antislip Floors, of which the following is a full, clear, and exact description.

My invention relates to antislip floors or treads, and is designed to overcome or reduce the tendency of abrasive grains to work out of their setting or matrix when used directly.

My invention is based upon the discovery that antislip material is greatly improved in its resistance to being pulled or worked out of its matrix if the material is used in the form of fragments broken from a mass or block of grains united without any bond between them.

In these fragments, the abrasive grains are welded to each other by self bonding or by sintering or incipient fusion thereof, without destroying their individual characteristics.

If the abrasives used are artificial aluminous abrasives, I preferably mold them into a shape, block, or mass without any binder, and heat this mass, preferably in an electric furnace, to a temperature of sintering or incipient fusion which will weld the grains together. This temperature will vary with the character and amount of the material; and I have successfully employed temperatures varying from 1300° C. up to 1800° C. Such aluminous abrasives do not consist of pure alumina, but also contain oxides of iron and titanium together with silica, alumina, and lime in various proportions. The composition varies with the quality of the abrasive and the fusion methods used in making such artificial aluminous abrasives.

In my step of agglomerating, no separate binder is added and the grains are directly welded to each other without destroying their individual characteristics.

The mass is then cooled and broken up, and the fragments are porous but of great strength and have highly desirable characteristics as antislip material. They may be crushed and graded into fragments or aggregates of different sizes in any desired manner.

If silicon carbide abrasive grains are used for this purpose, I may use any one of several methods well known in the art for making a self-bonded mass of silicon carbide grains. For example, I may take a mass of silicon carbide grains of No. 50 to 150 mesh, add a temporary binder such as flour and water and mold into blocks of the size of an ordinary 9 inch fire brick. The blocks are then placed in the mixture of a silicon carbide furnace of the well known type and brought up to the temperature of the formation of carborundum. This treatment produces a welding or self-bonding of the grains into a solid block of great strength and resistance to wear without substantially altering the individual characteristics of the grains. After the blocks thus converted are taken from the furnace, they are crushed and screened to fragments of the desired sizes.

I have used with good results the size which will pass over a one-eighth inch mesh screen and through a three-eighths inch mesh screen. Fragments thus produced are found to give excellent results when used as aggregates in antislip material such as cement floors and the like, on account of the adhesion which their porous surfaces offer to cement or other matrix or binder. For example, in the manufacture of terrazzo flooring, a mixture may be made of one part of these silicon carbide fragments, three parts marble chips and two parts Portland cement. This may be mixed with a proper proportion of water into a thick mortar in the well known practice of laying terrazzo floors, and the mixture is then spread on the concrete or other foundation to a thickness of about one inch. It is then trowelled or rolled down in the ordinary manner, and after setting for a sufficient time to complete the preliminary hardening, it is surfaced off with a grinding wheel and rubbed down and polished to a finished surface. Other binders and methods of making floor surfaces and tread units, such as are well known in this art, may be also used.

The fragments may also be used in the manufacture of tile using a vitrified binder. For this purpose, I preferably use fragments of about one-eighth of an inch and smaller.

The fragments above described are also valuable in the laying of antislip sidewalks and pavements. They adhere very strongly to the cement, much more strongly than would the individual silicon carbide grains.

The material thus formed has greater strength and resistance to wear. It also has sufficient porosity to offer a rough and antislip surface, even after the floor or tile has been polished. The fragments are well adapted for use with all varieties of bonding agents used in floor construction, such as magnesium oxychloride, ceramic bonds, rubber bonds, and the like.

Many variations may be made in the abrasive material used, the temperatures employed in bonding the grains directly to each other, the method of crushing, etc., without departing from my invention.

I claim:

1. An antislip floor or tread having embedded in fragments of a self-bonded mass of abrasive grains united without a separate binder under high temperature.

2. An antislip floor or tread having Portland cement with fragments embedded therein, said fragments being broken portions of a self-sintered mass of abrasive grains free from added binder.

3. A terrazzo floor having embedded in the cement abrasive fragments broken from a block of abrasive grains sintered without the addition of added binder.

In testimony whereof I have hereunto set my hand.

FRANK J. TONE.